US010885805B2

(12) United States Patent
Zintel

(10) Patent No.: US 10,885,805 B2
(45) Date of Patent: Jan. 5, 2021

(54) DEVICE TO MARK FINGERINGS OF A STRINGED MUSICAL INSTRUMENT RELATIVE TO CAPO PLACEMENT

(71) Applicant: Harold Albert Zintel, Kensington, MD (US)

(72) Inventor: Harold Albert Zintel, Kensington, MD (US)

(73) Assignee: Harold Zintel, Kensington, MD (US)

( * ) Notice: Subject to any disclaimer, the term of this patent is extended or adjusted under 35 U.S.C. 154(b) by 61 days.

(21) Appl. No.: 16/251,218

(22) Filed: Jan. 18, 2019

(65) Prior Publication Data

US 2020/0013309 A1 Jan. 9, 2020

Related U.S. Application Data

(60) Provisional application No. 62/624,861, filed on Feb. 1, 2018.

(51) Int. Cl.
*G09B 15/00* (2006.01)
*G10D 3/053* (2020.01)

(52) U.S. Cl.
CPC ........... *G09B 15/004* (2013.01); *G10D 3/053* (2020.02)

(58) Field of Classification Search
CPC .. G09B 15/004; G09B 15/005; G09B 15/006; G09B 15/008; G09B 15/02; G09B 15/026; G09B 15/009; G10D 3/053
See application file for complete search history.

(56) References Cited

U.S. PATENT DOCUMENTS

| 6,156,961 A * | 12/2000 | Beckmeier | G10D 3/06 84/293 |
| 6,452,080 B1 * | 9/2002 | Coonce | G09B 15/06 84/314 R |
| 2007/0051226 A1 * | 3/2007 | Diaz | G10H 1/0016 84/477 R |
| 2009/0071314 A1 * | 3/2009 | Huwaldt | G10G 1/02 84/314 R |

* cited by examiner

*Primary Examiner* — Daniel J Colilla

(57) ABSTRACT

A playing aid for a stringed musical instrument comprised of an elastic member attached to a capo at one end and near the bridge at the other end. The elastic member has marks along its length indicating a certain number of frets between that mark and the capo. When the capo is attached in different locations along the neck, the elastic member stretches such that the number of frets between the capo and each marker is constant regardless of the capo position.

14 Claims, 5 Drawing Sheets

DEVICE TO MARK FINGERINGS OF A STRINGED MUSICAL INSTRUMENT RELATIVE TO CAPO PLACEMENT

RELATED U.S. APPLICATION DATA

I claim priority to provisional application No. 62/624,861 Feb. 1, 2018

FIELD

The present invention relates to a device to be used with stringed musical instruments in conjunction with a capo for marking frets relative to capo placement.

BACKGROUND

The strings 8 (FIGS. 1 and 3) of a fretted instrument can either be excited to vibrate between a nut 1 (FIGS. 1, 2 and 5) and a saddle 2 (FIGS. 1, 2 and 3) (refereed to as open) or excited to vibrate between the saddle 2 and a fret 6 (FIGS. 1, 2, 3 and 5) (refereed to as fingered). It is common practice to place fret markers 3 (FIG. 1) on the fretboard 5 (FIG. 1) of stringed musical instruments to help the player easily locate frets. For example, the octave is marked with two dots on the same fret 9 (FIG. 1). When a player fingers on the two marks, the string becomes fixed at the $12^{th}$ fret and the string will vibrate at twice the frequency, the octave, of the same string played open.

A capo 4 (FIGS. 1, 2, 3, 4 and 5) is commonly used by stringed instrument players to transpose from one key to another. The capo fixes one end of the strings to a fret and reduces the free vibrating length of the open string. Effectively, the capo 4 replaces the nut 1 and fingerings stay the same relative to the capo, but the key is transposed higher. In this disclosure, a string vibrating between the fret held by a capo and the saddle is refereed to as capo-ed. For instance, if a guitar is played in the key of D major without a capo, placing a capo at the second fret will permit the player to use the same fingering to play in the key of E major, two half steps higher, by replacing the nut with a capo.

Shubb teaches the design of a capo in U.S. Pat. No. 4,250,790 but not the use of movable fret markers.

Gunnar teaches a device using lights as markers embedded in a fingerboard that change according to the placement of a capo/capodaster in DE 4141390 C2, but not an elastic member with markers.

SUMMARY OF THE INVENTION

Technical Problem

The problem that this invention addresses is that the fret markers, typically inlaid in the instrument's neck, do not change with the position of a capo. When a capo is placed on the instrument, for example at the $1^{st}$ fret (numbering starts nearest the nut), the middle of the capo-ed string should then fingered at the $13^{th}$ fret relative to the nut, not the $12^{th}$ fret as indicated by the fixed makers. The fixed markers do not reflect the capo position and the player must quickly compensate, while playing, to find the octave/middle fret of the open string using the fixed markers.

Solution to Problem

The solution described in this patent is to utilize an elastic member that is marked with fret markers.

Fret placement of an equally tempered musical scale follow a geometric relationship: the distance of each fret, to the saddle, decreases by the same multiplicative factor, from fret to adjacent fret. A uniform elastic strip also has a constant ratio of the length, from a fixed mark on the elastic member to the saddle, to the total stretched length of the elastic member, since the entire member is subjected to the same tension. As a result, if an elastic member is stretched from a fret to the saddle, and marks are placed on the elastic member at each fret, moving the end of the elastic member to a new fret location will result in the marks all lining up with new frets.

For example, the octave of an open string is fretted 12 frets from the capo or nut (in standard 12 note tempered chromatic scale). The octave is a ratio of 2 with respect to frequency and a ratio of ½ in respect to vibrating length. When the capo is moved, the elastic member changes length to the new open string length. A mark placed on the elastic member in the middle, remains in the middle regardless of the capo's position. The octave of a capo-ed string (in a 12 note tempered chromatic scale) is 12 frets from the capo. Similar reasoning holds for the rest of the frets. Marks on the elastic member will indicate the number of frets to the capo regardless of the capo's position.

Advantageous Effects of Invention

A player can easily identify proper fingerings when a capo is being used.

DESCRIPTION OF EMBODIMENT

Figure 1:
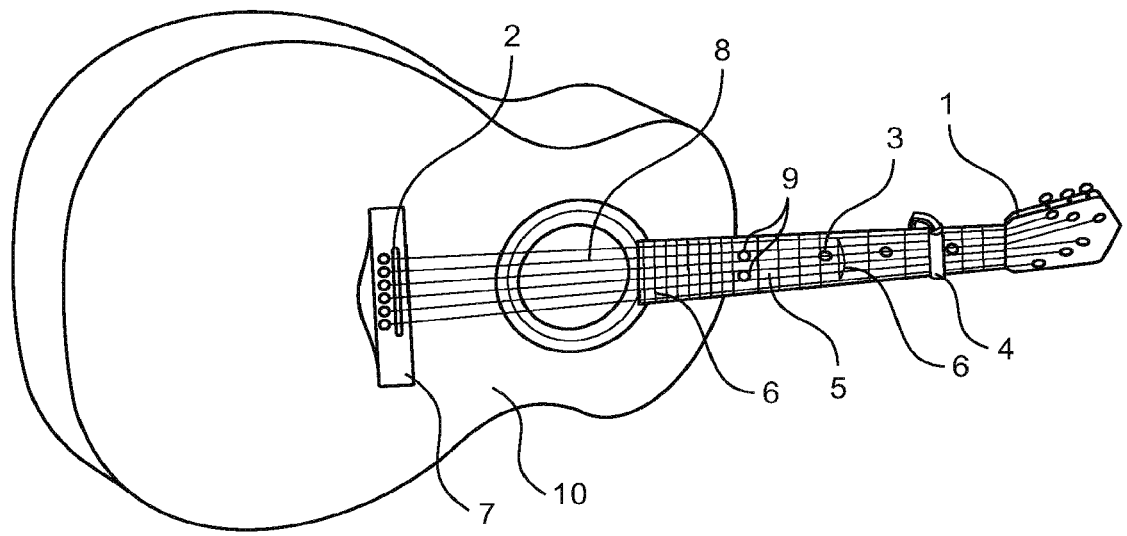
FIG. 1—FIG. 1 shows a prior art guitar.

In the preferred embodiment, an elastic member 20 (FIGS. 2, 3, 4 and 5) is connected to a capo 4 (FIGS. 1, 2, 3, 4 and 5) at one end and to a soundboard stop 11 (FIGS. 2, 3, and 5) near the saddle 2 (FIGS. 1, 2 and 3) at the other end. The soundboard stop is fixed to the soundboard by a removable double sided adhesive strip. The elastic member 20 is stretched to nearly the same length as the capo-ed string. Said elastic member is designed to not directly attached at the saddle, since attachment at the saddle requires an irreversible modification of the bridge. To keep the marks in their proper relationship to the frets, the elastic member is rigid over some portions, double thickness over other portion and single thickness over the rest of the elastic member's length.

Figure 2:
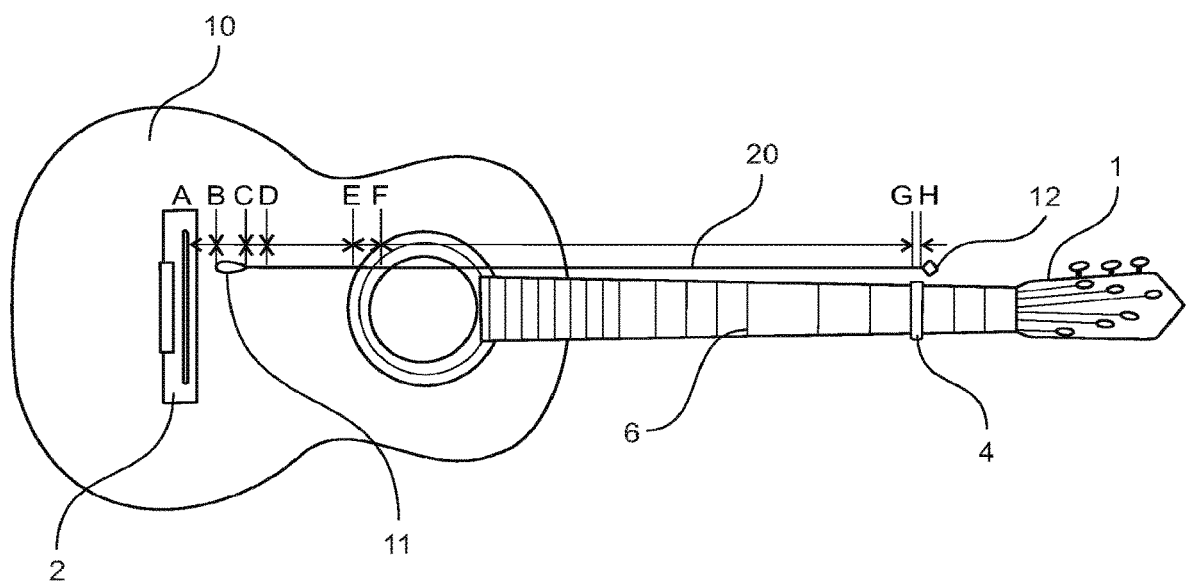
FIG. 2—FIG. 2 shows the details of the elastic member.
Figure 3:
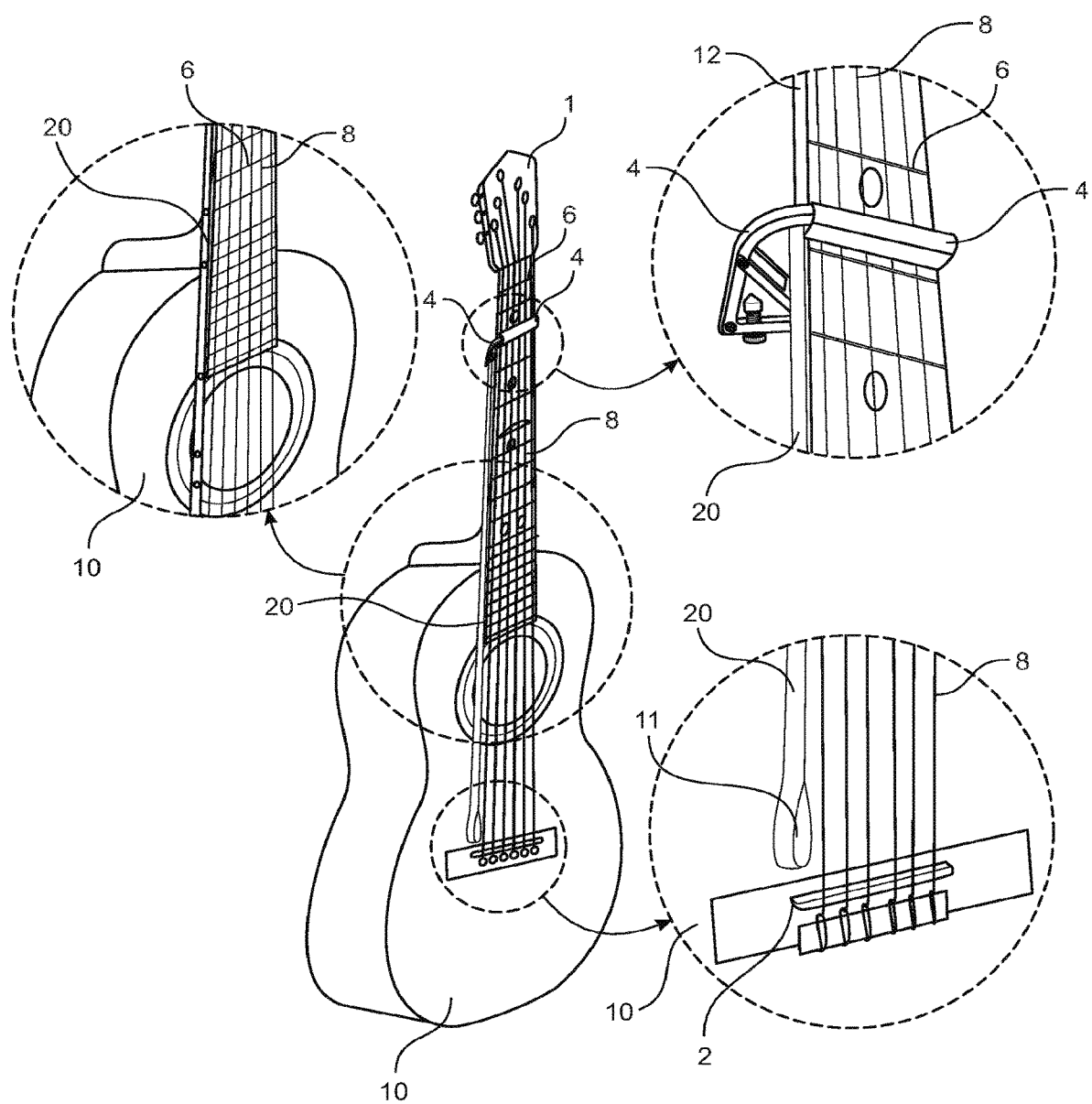
FIG. 3—FIG. 3 shows the attachment points of the elastic member.
Figure 4:
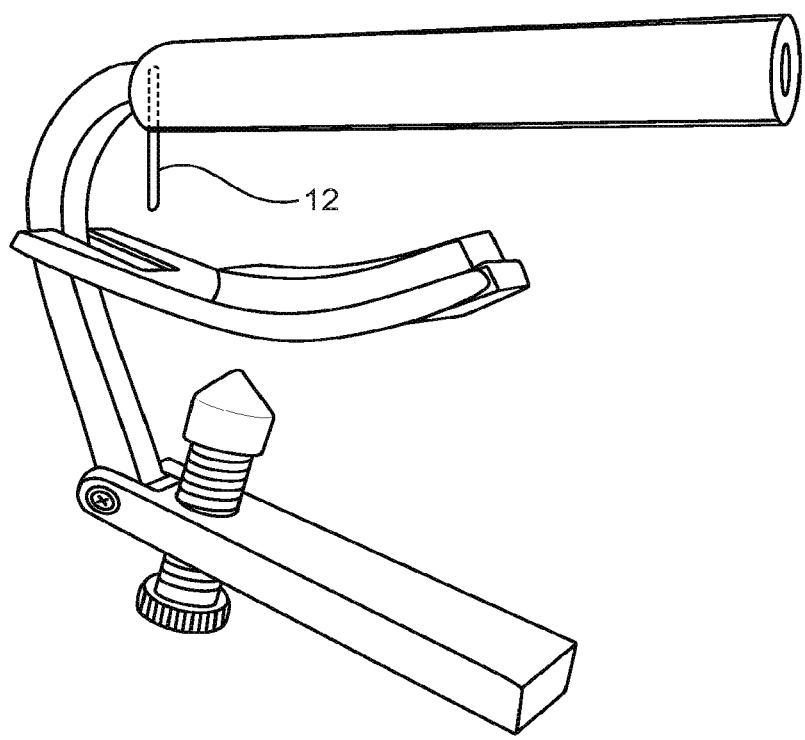
FIG. 4—FIG. 4 shows a capo modified to be used in this device.
Figure 5:
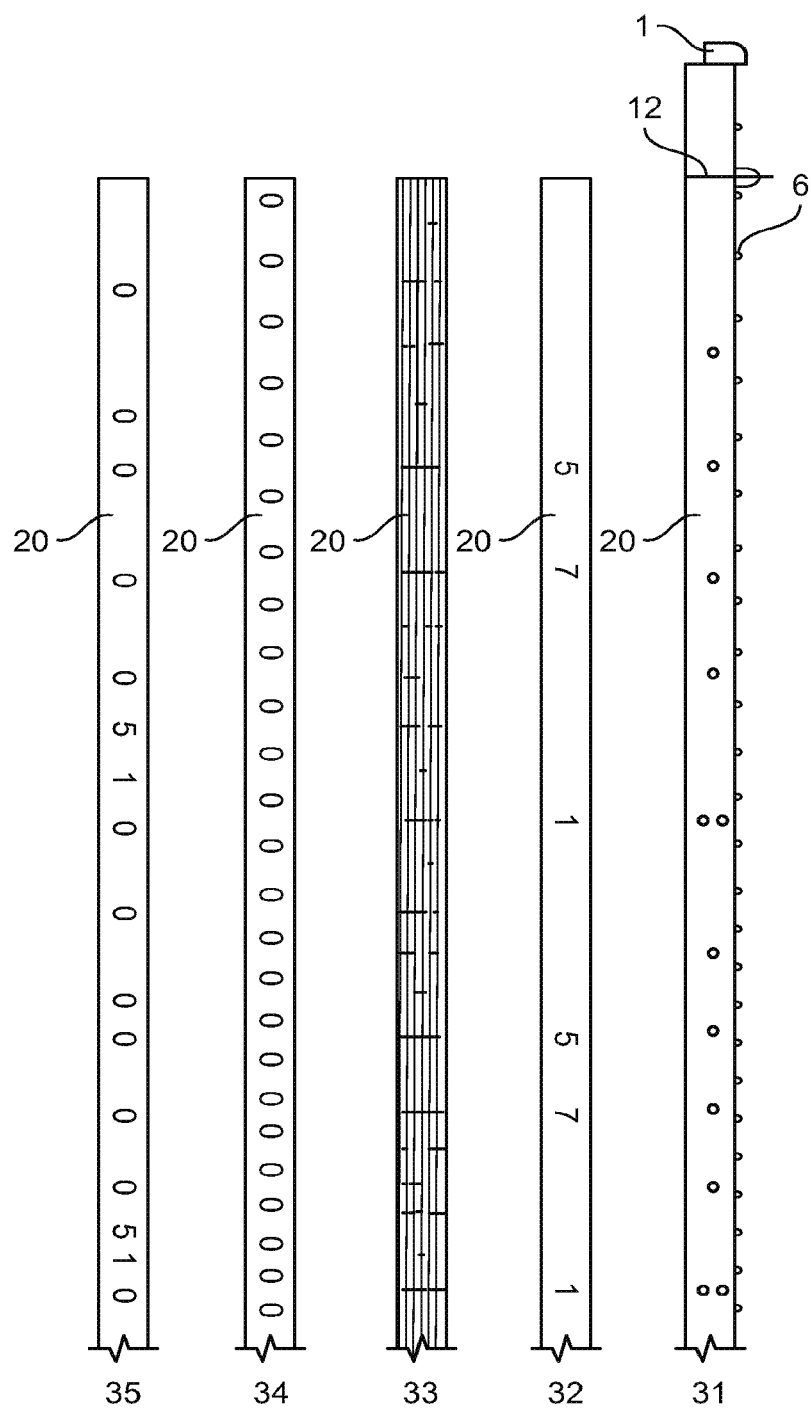
FIG. 5—FIG. 5 shows different markings of the elastic member.

The elastic member 20 is constructed from a single length of uniform elastic strip, typically used in clothing manufacturing. The elastic strip begins at point D (FIG. 2). The elastic strip is then looped around the soundboard stop 11 and is glued to itself in section CD. The elastic strip then wraps around a pin 12 (FIGS. 4 and 5). Said pin 12 (FIG. 4) is press fitted into a hole in the capo 4 (FIG. 4). The elastic strip wraps around said pin as a means to attach the elastic member to the capo. In section GH the member is again glued back to itself to create a loop to receive the pin. The remainder of the elastic strip is doubled in section GF, and glued to itself in section EF. A cyanoacrylate is used to glue the elastic member to itself. A sufficient amount of glue is used to make the elastic member rigid in the glued sections (relative to the compliance of the elastic member that is not glued).

The elastic member is constructed such that the total of the lengths of the rigid sections: AB, CD and EF, equals the length of the single thickness section DE. The lack of deflection in the rigid sections is compensated for by the doubled deflection of the single thickness section. In this way the deflection of point F deforms as would a doubled elastic strip fixed at point A. Point G is aligned with the capo-ed fret, so deformation of the elastic member begins at the cape-ed fret. Over section FG, the elastic member in FG acts as would a uniform double thickness elastic strip connected at the capo-ed fret and the saddle. As a result, marks placed on section FG align with the frets as the capo is moved.

In the preferred embodiment, the elastic member is marked as in 31 (FIG. 5) as taught for fixed markers in the prior art. FIG. 31 shows the nut 1, frets 3, the capo 4 at the second fret. Only the portion of the elastic member 20 that covers the edge of the fretboard is shown in all embodiments in FIG. 5.

In another embodiment 32, the elastic member is marked with colored markers or symbols representing musical intervals, where 1, 5 and 7 represent different colors or markers.

In another embodiment 33, the elastic member is marked with several lines representing strings. The elastic member is marked to show a G (with no capo) major scale played on a standard tuned guitar. Using these markings with said capo on the second fret results in a A major scale. It should be obvious to those in the art that the marks also show related modes in different keys. Marks on said lines are finger positions of the major scale. Replaceable elastic members may also show markings for minor, pentatonic, mixolydian, gypsy, Indian or other scales known in the art.

In another embodiment 34, the device shows marking for a fretless instruments. The marks are placed where the string should be fingered for the desired notes and not between frets as for the fretted instrument.

In another embodiment 35, a marking for an open tunings is depicted. The following notation is used for the description of open tunings. 1 denotes the string that when played open is the tonic of the key of the tuning. 5 denotes strings that when played open are a musical 5th of the key. All strings that are octaves of each other have the same fingering. Comparing the 1 and 5 strings, only one finger position in an octave is different in the seven western mode scales: Ionian, Dorian, Phrygian, Lydian, Mixolydian, Aeolian and Locrian. The color code taught here is to use a first color for notes that are fingered on the same fret on both the 1 and 5 strings depicted as o's in 35, a second color for notes only played on the 1 string only, depicted as 1's, and a third color for notes only played on the 5 string, depicted as 5's. The markings in 35 are for a Major scale. Similar marking can be used for other scales.

It should be clear to anyone in the art that this device could be used with any stringed musical instrument tunings.

Magnets, hooks, adhesive or other means of attachment known to the art may also be used to attach the ends of the elastic part.

The elastic member can be marked with embroidery, ink, decals or beads and applied by a computer controlled device, silk screened or hand drawn.

The elastic member can be constructed of any material with sufficient elasticity.

The elastic member can be recessed into the fingerboard or covered with a transparent cover so that the players hand does not contact the elastic member when the hand is wrapped around the neck.

The device may be used with the capo located at the nut as a means to located frets relative to the nut.

INDUSTRIAL APPLICABILITY

Sale as an accessory for a capo used with a stringed instrument.

CITATION LIST

Shubb U.S. Pat. No. 4,250,790.
Gunnar DE 4141390.

I claim:

1. A marking device for use with, a stringed musical instrument and a capo, comprising:
    1. an elastic member containing one or more visual markers,
    2. a first connections means connecting one end of said elastic member to said capo,
    3. and second connection means to connect the other end of said elastic member to said musical instrument;
    wherein said elastic member is adjacent and substantially parallel to strings over some portion of a fingerboard of the musical instrument.

2. The marking device of claim 1 wherein visual markers are placed adjacent to one or more fingering positions relative to capo placement.

3. The marking device of claim 2 wherein the visual markers are lights, ink, thread or other means known in the art.

4. The marking device of claim 2 wherein said visual markers are a plurality of colors.

5. The marking device of claim 2 wherein a plurality of visual markers are placed at individual fingering locations on the elastic member representing fingerings on individual strings.

6. The marking device of claim 5 wherein said visual markers identify musical scales.

7. The device of claim 1 wherein said first connection means is comprised of two parts; a part connected to said capo and a mating part connected to said elastic member, such that said elastic member is quickly removable from said part connected to said capo.

8. The device of claim 1 wherein said second connection means comprises two parts; a part connected to said musical instrument and a mating part connected to said elastic member, such that said elastic member is quickly removable from said part connected to musical instrument.

9. The device of claim 8 wherein said part connected to said musical instrument is attached by means of removeable adhesive.

10. The device of claim 1 wherein said elastic member is of uniform elasticity over some portion of said elastic member adjacent and substantially parallel to strings.

11. The marking device of claim 1 wherein said elastic member is of uniform elasticity over a portion substantially equal in length, to a distance between where the capo restrains the strings and a saddle of the musical instrument; and substantially rigid over the remaining portions.

12. The marking device of claim 1 wherein said elastic member is composed of substantially rigid portions, and a plurality of portions of different elasticities.

13. The marking device of claim 12 wherein a portion of said elastic member not adjacent to the fingerboard is less stiff, relative to said portion adjacent and substantially parallel to strings, and the total length of the nonrigid portions of said elastic member is shorter than the distance from said capo to a saddle of the musical instrument.

14. The marking device of claim 1 wherein said elastic strip is connected to said musical instrument such that said elastic member passes from the capo, past a point near a saddle of the musical instrument, to an attachment point on said musical instrument and; said elastic member is rigid in the portion between said saddle and said attachment point on said musical instrument.

* * * * *